United States Patent
Ando

(10) Patent No.: US 11,535,273 B2
(45) Date of Patent: *Dec. 27, 2022

(54) VEHICLE CONTROL INTERFACE AND VEHICLE SYSTEM

(71) Applicant: TOYOTA JIDOSHA KABUSHIKI KAISHA, Toyota (JP)

(72) Inventor: Eisuke Ando, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 13 days.

This patent is subject to a terminal disclaimer.

(21) Appl. No.: 16/815,134

(22) Filed: Mar. 11, 2020

(65) Prior Publication Data

US 2020/0324789 A1 Oct. 15, 2020

(30) Foreign Application Priority Data

Apr. 10, 2019 (JP) .............................. JP2019-074880

(51) Int. Cl.
*B60W 60/00* (2020.01)
*G05D 1/02* (2020.01)

(52) U.S. Cl.
CPC .... *B60W 60/0011* (2020.02); *B60W 60/0025* (2020.02); *G05D 1/0223* (2013.01); *G05D 2201/0213* (2013.01)

(58) Field of Classification Search
None
See application file for complete search history.

(56) References Cited

U.S. PATENT DOCUMENTS

| 6,154,688 A | 11/2000 | Dominke et al. |
| 2005/0027402 A1 | 2/2005 | Koibuchi et al. |
| 2008/0288150 A1 | 11/2008 | Isogai et al. |

(Continued)

FOREIGN PATENT DOCUMENTS

| JP | H10-250417 A | 9/1998 |
| JP | 2003-191774 A | 7/2003 |

(Continued)

OTHER PUBLICATIONS

Dec. 8, 2021 Office Action issued in U.S. Appl. No. 16/802,671.

(Continued)

*Primary Examiner* — James J Lee
*Assistant Examiner* — Andrew Sang Kim
(74) *Attorney, Agent, or Firm* — Oliff PLC

(57) ABSTRACT

A vehicle control interface connects a vehicle platform including a first computer that performs travel control of a vehicle and an autonomous driving platform including a second computer that performs autonomous driving control of the vehicle. The vehicle control interface includes a control unit configured to execute: acquiring, from the second computer, a first control command including a plurality of commands for the vehicle platform; removing, from the first control command, a command that does not correspond to a predetermined kind of command by filtering the plurality of commands included in the first control command; converting the first control command, after filtering the plurality of commands, into a second control command for the first computer; and transmitting the second control command to the first computer.

11 Claims, 8 Drawing Sheets

(56) References Cited

U.S. PATENT DOCUMENTS

| | | | |
|---|---|---|---|
| 2012/0109460 A1 | 5/2012 | Tokimasa et al. | |
| 2015/0234382 A1* | 8/2015 | Ju | G01S 7/003 |
| | | | 701/23 |
| 2015/0375740 A1 | 12/2015 | Okamura et al. | |
| 2017/0036677 A1 | 2/2017 | Blumentritt et al. | |
| 2017/0158199 A1 | 6/2017 | Pallett et al. | |
| 2017/0334453 A1 | 11/2017 | Mimura et al. | |
| 2018/0086336 A1* | 3/2018 | Jones | B60W 30/09 |
| 2018/0162412 A1 | 6/2018 | Gao et al. | |
| 2018/0211061 A1* | 7/2018 | Scheid | G07C 5/00 |
| 2018/0341266 A1 | 11/2018 | Morimura | |
| 2020/0148218 A1 | 5/2020 | Huang et al. | |
| 2020/0324788 A1 | 10/2020 | Ando | |
| 2020/0331494 A1 | 10/2020 | Ando | |

FOREIGN PATENT DOCUMENTS

| | | |
|---|---|---|
| JP | 2006-256457 A | 9/2006 |
| JP | 2008-279983 A | 11/2008 |
| JP | 2011-156955 A | 8/2011 |
| JP | 2018-016107 A | 2/2018 |
| JP | 2018-132015 A | 8/2018 |
| JP | 2018-198485 A | 12/2018 |
| JP | 2020-172165 A | 10/2020 |
| WO | 03/059680 A1 | 7/2003 |

OTHER PUBLICATIONS

Apr. 15, 2022 Office Action issued in U.S. Appl. No. 16/802,671.
Aug. 3, 2022 Advisory Action issued in U.S. Appl. No. 16/802,671.
Aug. 31, 2022 Office Action issued in U.S. Appl. No. 16/802,671.

\* cited by examiner

FIG. 4

| DATA NAME | TYPE |
|---|---|
| DESIGNATING ACCELERATION & DECELERATION | INPUT |
| DESIGNATING STEERING ANGLE | INPUT |
| DESIGNATING SHIFT RANGE | INPUT |
| DESIGNATING PARKING BRAKE STATE | INPUT |
| DESIGNATING POWER SUPPLY MODE | INPUT |
| BRAKE SYSTEM STATE | OUTPUT |
| POWERTRAIN SYSTEM STATE | OUTPUT |
| DIRECTION CONTROL STATE | OUTPUT |

PHYSICAL CONTROL AMOUNT (ACCELERATION & DECELERATION)

PHYSICAL CONTROL AMOUNT (STEERING ANGLE)

VALUE OF PHYSICAL CONTROL AMOUNT PER TIME STEP

VEHICLE CONTROL INTERFACE AND VEHICLE SYSTEM

INCORPORATION BY REFERENCE

The disclosure of Japanese Patent Application No. 2019-074880 filed on Apr. 10, 2019 including the specification, drawings and abstract is incorporated herein by reference in its entirety.

BACKGROUND

1. Technical Field

The present disclosure relates to vehicle control.

2. Description of Related Art

Studies have been actively conducted on the autonomous driving of vehicles. For example, Japanese Unexamined Patent Application Publication No. 2018-132015 (JP 2018-132015 A) discloses a vehicle system in which an autonomous driving ECU having a sensing function for detecting the surroundings of a vehicle is provided in the vehicle in addition to an engine ECU, and the autonomous driving ECU issues a command to the engine ECU via an in-vehicle network. As in the disclosure described in JP 2018-132015 A, it is possible to add an autonomous driving function to the vehicle by separately providing an ECU that manages vehicle power and an autonomous driving ECU without drastically changing the existing vehicle platform. In addition, the development, by third parties, of autonomous driving functions can be expected.

SUMMARY

In a case where the autonomous driving ECU and the ECU that manages the vehicle power (for example, the engine ECU) are supplied by different vendors, compatibility may become an issue. Furthermore, if the autonomous driving ECU can also access unnecessary information, from among information flowing through the in-vehicle network, security may also become an issue.

The present disclosure has been made in consideration of the issues stated above, and is intended to provide a vehicle control interface that achieves both versatility and security.

A vehicle control interface according to the present disclosure connects a vehicle platform including a first computer that performs travel control of a vehicle and an autonomous driving platform including a second computer that performs autonomous driving control of the vehicle. The vehicle control interface includes: a control unit configured to execute: acquiring, from the second computer, a first control command including a plurality of commands for the vehicle platform; removing, from the first control command, a commands that does not correspond to a predetermined kind of command by filtering the plurality of commands included in the first control command; converting the first control command, after filtering the plurality of commands, into a second control command for the first computer; and transmitting the second control command to the first computer.

Moreover, a vehicle system according to the present disclosure includes: a vehicle platform including a first computer that performs travel control of a vehicle; and a vehicle control interface configured to connect the vehicle platform and an autonomous driving platform including a second computer that performs autonomous driving control of the vehicle. The vehicle control interface includes a control unit configured to execute: acquiring, from the second computer, a first control command including a plurality of commands for the vehicle platform; removing, from the first control command, the commands that do not correspond to a predetermined kind of command by filtering the plurality of commands included in the first control command; converting the first control command, after filtering the plurality of commands, into a second control command for the first computer; and transmitting the second control command to the first computer.

A vehicle control interface according to another aspect of the present disclosure connects a vehicle platform including a first computer that performs travel control of a vehicle and an autonomous driving platform including a second computer that performs autonomous driving control of the vehicle. The vehicle control interface includes: a control unit configured to execute: acquiring, from the first computer, first vehicle information including pieces of sensor data sensed in the vehicle platform; removing, from the first vehicle information, information that does not correspond to a predetermined sensor data type by filtering the pieces of sensor data included in the first vehicle information; converting the first vehicle information, after filtering the pieces of sensor data, into second vehicle information for the second computer; and transmitting the second vehicle information to the second computer.

Moreover, a vehicle control interface according to yet another aspect of the present disclosure connects a vehicle platform including a first computer that performs travel control of a vehicle and an autonomous driving platform including a second computer that performs autonomous driving control of the vehicle. The vehicle control interface includes a control unit configured to execute: acquiring, from the second computer, a first control command including a plurality of commands for the vehicle platform; removing, from the first control command, the commands that do not correspond to a predetermined command type by filtering the plurality of commands included in the first control command; converting the first control command, after filtering the plurality of commands, into a second control command for the first computer; transmitting the second control command to the first computer; acquiring, from the first computer, first vehicle information including pieces of sensor data sensed in the vehicle platform; removing, from the first vehicle information, the sensor data that does not correspond to a predetermined sensor data type by filtering the pieces of sensor data included in the first vehicle information; converting the first vehicle information, after filtering the pieces of sensor data, into second vehicle information for the second computer; and transmitting the second vehicle information to the second computer.

Another aspect of the present disclosure relates to an information processing method executed by the vehicle control interface, a program for causing a computer to execute the information processing method executed by a computer, or a non-transitory computer-readable storage medium for storing the program.

According to the present disclosure, it is possible to provide a vehicle control interface that achieves both versatility and security.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 4 is a diagram illustrating data to be converted;

DETAILED DESCRIPTION OF EMBODIMENTS

Proposed is a configuration in which a vehicle platform, including a computer that controls vehicle power, is provided independently from an autonomous driving platform that makes determinations on autonomous driving, and both platforms are installed in a vehicle system. For example, the autonomous driving platform detects the surroundings of a vehicle, and transmits a control command to the existing vehicle platform based on the detection results. With such a configuration, independent vendors can develop each platform, so that it is possible to promote the development of autonomous driving functions by third parties.

Meanwhile, various issues can occur in a case where platforms developed by different vendors are installed in the same vehicle system, that is, a vehicle power system and an autonomous driving system, that issues a control command to the vehicle power system, are connected to the same in-vehicle network. One of the potentially occurring issues is that commands for controlling the vehicle platform are not unified according to manufacturer and vehicle type. For example, the input or output of the engine ECU are different depending on the manufacturer and vehicle type, thus it is expensive to design an autonomous driving ECU compatible with all vehicle types. Furthermore, since various information for controlling the vehicle flows through the in-vehicle network, it is not desirable to allow that the autonomous driving platform (manufactured by a third party not directly related to the vehicle platform) can have unlimited access to those pieces of information.

Figure 1:
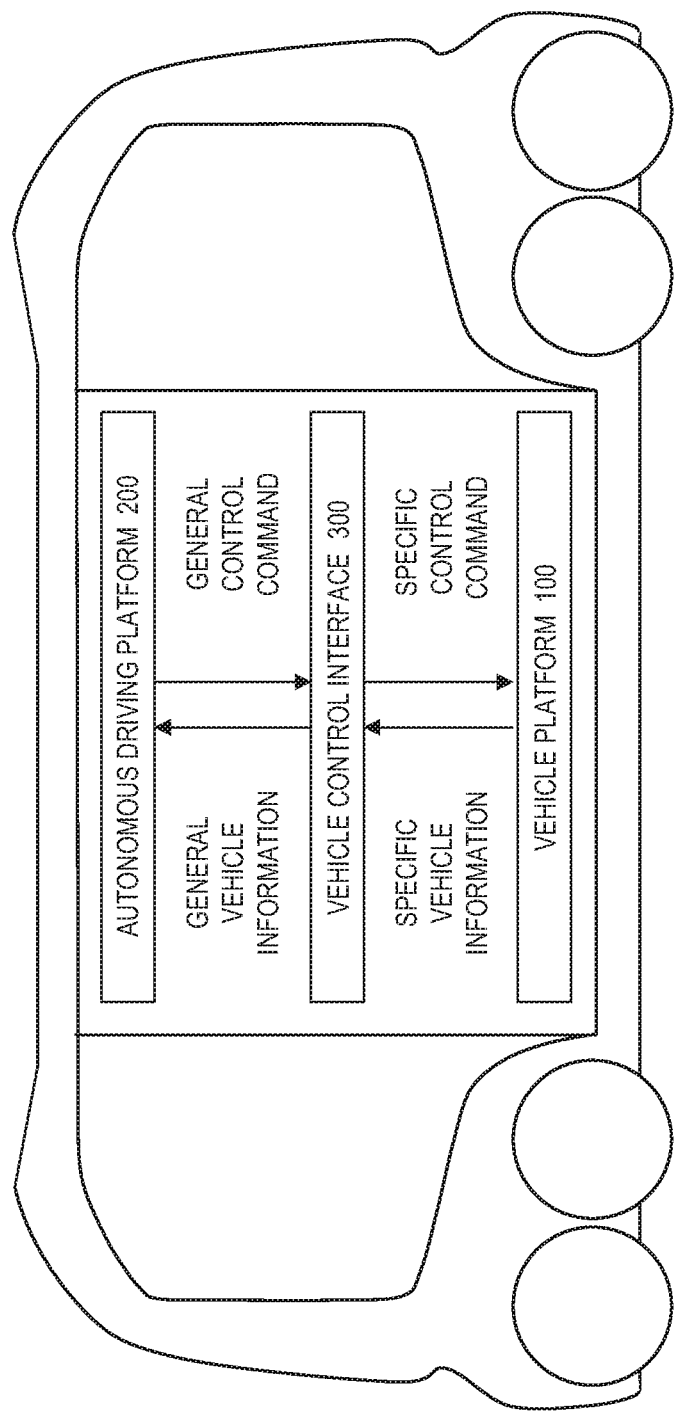
FIG. 1 is a schematic diagram of a vehicle system according to a first embodiment.

Therefore, the vehicle system according to the present embodiment is configured such that the vehicle platform and the autonomous driving platform are connected via the vehicle control interface to relay information. FIG. 1 is a schematic diagram of the vehicle system according to the present embodiment. A vehicle platform 100 is a platform including a first computer (for example, an engine ECU or the like) that performs travel control of a vehicle. An autonomous driving platform 200 is a platform including a second computer (for example, an autonomous driving ECU) that performs autonomous driving control of the vehicle. The autonomous driving platform 200 may have devices for detecting the surroundings of the vehicle, and devices for generating a travel plan based on the detection results.

A vehicle control interface 300 is a device that connects the vehicle platform 100 and the autonomous driving platform 200 and relays information input and output therebetween. In particular, the vehicle control interface 300 is configured to include a control unit, in which a first control command including a plurality of commands for the vehicle platform is acquired, the commands that do not correspond to a predetermined command type are filtered from the plurality of the commands, the first control command, after the plurality of commands are filtered, is converted into a second control command for the first computer, and the second control command is transmitted to the first computer.

The first control command is generated as a general command not specific to the connected vehicle platform. The first control command includes the plurality of commands for the vehicle platform. The plurality of commands include, for example, but is not limited to, a command for an engine system, a command for a powertrain system, a command for a brake system, a command for an electrical system, a command for a body system, and the like. Furthermore, a command is not necessarily provided for each vehicle component. For example, a command for accelerating or decelerating, and a command for steering may be used.

The control unit converts the first control command into the second control command for the first computer. Furthermore, the control unit removes, from the first control command, the commands that do not correspond to the predetermined command type by filtering the plurality of commands included in the first control command. For example, in a case where a rule is determined that only the command for acceleration or deceleration and the command for steering are converted, other commands (for example, a command for locking and unlocking the vehicle) are discarded without being converted. According to this configuration, it is possible to convert a general command into a command specific to a vehicle type or a manufacturer. Furthermore, in a case in which data that should not be transmitted to the vehicle platform 100 (for example, a command for a vehicle component that is not supposed to be accessed by the autonomous driving platform) is transmitted, such data can be appropriately filtered, and security can be achieved.

The vehicle control interface may further include a storage unit configured to store conversion information that is a rule for converting the first control command and the second control command, wherein the control unit converts the first control command into the second control command based on the conversion information. For example, the storage unit stores the rule (specific to the vehicle) for converting the first control command into the second control command in advance, and generates the control command to be transmitted to the vehicle platform based on data transmitted from the autonomous driving platform. According to such a configuration, it is possible to introduce the autonomous driving platform regardless of manufacturer or vehicle type.

Furthermore, the predetermined command type may at least include a command for accelerating or decelerating the vehicle and a command for steering the vehicle. This is because autonomous driving of the vehicle can be implemented by using at least the command for accelerating or decelerating the vehicle and the command for steering the vehicle as targets to be converted.

The control unit may be configured to execute: acquiring, from the first computer, first vehicle information including pieces of sensor data sensed in the vehicle platform; removing, from the first vehicle information, pieces of sensor data that do not correspond to a predetermined sensor data type by filtering the pieces of sensor data included in the first vehicle information; converting the first vehicle information, after filtering the piece of sensor data, into second vehicle information for the second computer; and transmitting the second vehicle information to the second computer.

As stated above, the vehicle control interface according to the present disclosure may have a function of converting the sensor data acquired in the vehicle platform into data in a format for the autonomous driving platform. In this case, it is preferable that only a predetermined type of sensor data is converted among pieces of the sensor data. This is because it is not preferable, in terms of security, to permit unlimited access to data generated in the vehicle platform. The first vehicle information may be data specific to the first computer, and the second vehicle information may be data not specific to the first computer.

First Embodiment

An outline of the vehicle system according to the first embodiment will be described. As shown in FIG. 1, the vehicle system according to the present embodiment is configured by the vehicle platform 100, the autonomous driving platform 200, and the vehicle control interface 300. The vehicle platform 100 is a conventional vehicle platform. The vehicle platform 100 operates based on the control command specific to the vehicle, and generates vehicle information specific to the vehicle. The control command and the vehicle information are encapsulated by, for example, a Controller Area Network (CAN) frame that flows through the in-vehicle network.

The autonomous driving platform 200 has a device for detecting the surroundings of the vehicle, and issues the control command that is not specific to a vehicle type or a manufacturer. Furthermore, vehicle information that is not specific to a vehicle type or a manufacturer is acquired. The vehicle control interface 300 converts the control command specific to the vehicle (that is, a control command that can be interpreted by the vehicle platform 100) into a control command not specific to the vehicle (that is, a control command generated by the autonomous driving platform 200), and vice versa. Furthermore, the vehicle control interface 300 also converts the vehicle information specific to the vehicle (that is, vehicle information generated by the vehicle platform 100) into vehicle information not specific to the vehicle (that is, vehicle information that can be interpreted by the autonomous driving platform 200), and vice versa.

Figure 2:
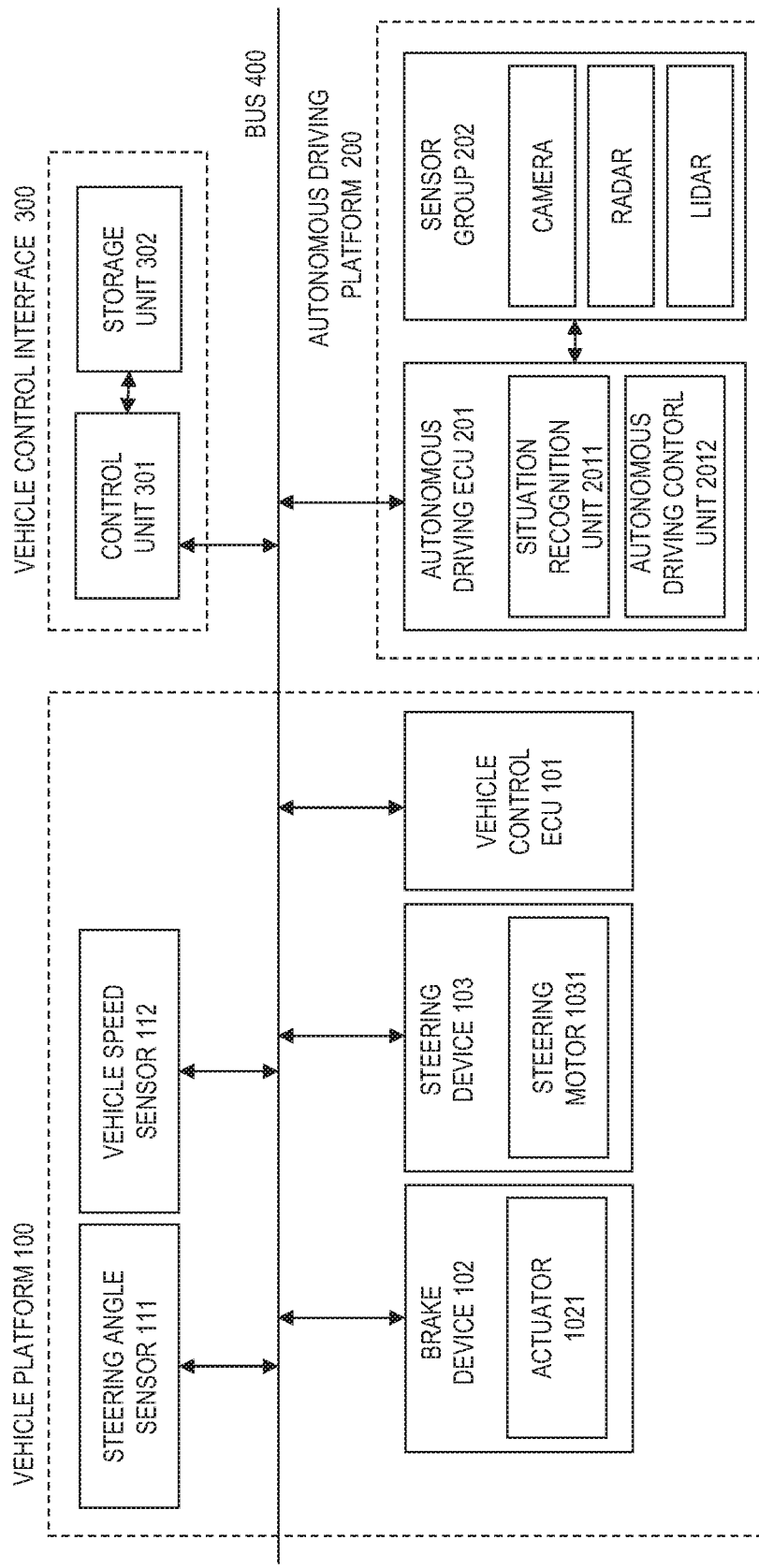
FIG. 2 is a block diagram schematically showing one example of components provided in the system.

Next, components of the system will be described in detail. FIG. 2 is a block diagram schematically showing one example of a configuration of the vehicle system which is shown in FIG. 1. The vehicle system includes the vehicle platform 100, the autonomous driving platform 200, and the vehicle control interface 300, and each component is communicably connected by a bus 400.

The vehicle platform 100 includes a vehicle control ECU 101, a brake device 102, a steering device 103, a steering angle sensor 111, and a vehicle speed sensor 112. In this example, a vehicle with an engine is exemplified, but an electric vehicle may be used. In this case, the engine ECU can be replaced with an ECU that manages the vehicle power. Furthermore, the vehicle platform 100 may be equipped with ECUs and sensors which are different from those illustrated.

The vehicle control ECU 101 is a computer that controls components of the vehicle (for example, engine system components, power train system components, brake system components, electrical system components, and body system components). The vehicle control ECU 101 may be a set of computers. The vehicle control ECU 101 controls engine speed, for example, by performing fuel injection control. The vehicle control ECU 101 can control the rotation speed of an engine based on, for example, the control command (for example, a command for designating a degree of throttle opening) generated by an occupant's operation (for example, operating an accelerator pedal).

In a case in which the vehicle is an electric vehicle, the vehicle control ECU 101 can control a rotation speed of a motor by controlling a drive voltage, current, drive frequency, and the like. In this case, the rotational speed of the motor can also be controlled based on the control command generated by the occupant's operation, as in a case of an internal combustion vehicle. Furthermore, it is possible to control a regenerative current based on a pressing force on a brake pedal and a control command indicating a degree of regenerative braking. In a case where the vehicle is a hybrid vehicle, control for both the engine and the motor may be carried out.

In addition, the vehicle control ECU 101 can control a braking force by a mechanical brake by controlling an actuator 1021 included in the brake device 102 described later. The vehicle control ECU 101 can control a brake hydraulic pressure by driving the actuator 1021 based on, for example, the control command (for example, a command indicating the pressing force on the brake pedal) generated by an occupant's operation (for example, operating the brake pedal).

Furthermore, the vehicle control ECU 101 can control a steering angle or a steering wheel angle by controlling a steering motor 1031 included in the steering device 103 described later. The vehicle control ECU 101 can control a steering angle of the vehicle by driving a steering motor 1031 based on, for example, the control command (for example, a command indicating the steering angle) generated by the occupant's operation (for example, steering operation).

The control command may be generated in the vehicle platform 100 based on the occupant's operation, or may be generated outside the vehicle platform 100 (for example, by a device that controls autonomous driving).

The brake device 102 is a mechanical brake system provided in the vehicle. The brake device 102 includes an interface (such as the brake pedal), the actuator 1021, a hydraulic system, a brake cylinder, and the like. The actuator 1021 is a device for controlling the hydraulic pressure in the brake system. The braking force of the mechanical brake can be ensured by controlling the hydraulic pressure of the brake by the actuator 1021 which has received the command from the vehicle control ECU 101.

The steering device 103 is a steering system provided in the vehicle. The steering device 103 includes an interface (such as the steering wheel, the steering motor 1031, a gear box, and a steering column). The steering motor 1031 is a device for assisting the steering operation. A force required for the steering operation can be reduced by driving the steering motor 1031 which has received the command from the vehicle control ECU 101. Furthermore, it is possible to automate, by driving the steering motor 1031, the steering operation without depending on the occupant's operation.

The steering angle sensor 111 is a sensor that detects a steering angle acquired by the steering operation. A detected value acquired by the steering angle sensor 111 is transmitted to the vehicle control ECU 101 as needed. In the present embodiment, a numerical value that directly represents a turning angle of a tire is used as the steering angle, but a value that indirectly represents the turning angle of a tire may also be used. The vehicle speed sensor 112 is a sensor that detects vehicle speed. A detected value acquired by the vehicle speed sensor 112 is transmitted to the vehicle control ECU 101 as needed.

The autonomous driving platform 200 will be described hereinbelow. The autonomous driving platform 200 is a device that detects the surroundings of the vehicle, generates a travel plan based on the detection results, and issues a command to the vehicle platform 100 according to the plan. The autonomous driving platform 200 may be developed by a manufacturer or a vendor different from that of the vehicle platform 100. The autonomous driving platform 200 includes an autonomous driving ECU 201 and a sensor group 202.

The autonomous driving ECU 201 is a computer that controls the vehicle by making determinations on autonomous driving, based on data acquired from the sensor group 202 described later, and by communicating with the vehicle platform 100. The autonomous driving ECU 201 is configured by, for example, a CPU (central processing unit). The autonomous driving ECU 201 includes two functional modules, a situation recognition unit 2011 and an autonomous driving control unit 2012. Each functional module may be implemented by executing a program stored in a storage unit such as a ROM (read only memory) by a CPU.

The situation recognition unit 2011 detects an environment around the vehicle based on data acquired by sensors included in the sensor group 202 described later. Detection targets include, for example, but are not limited to, the number and positions of lanes, the number and positions of vehicles existing around the host vehicle, the number and positions of obstacles (for example, pedestrians, bicycles, structures, buildings, and the like) existing around the host vehicle, road structures, road signs, and the like. Any detection target may be used as long as it is necessary for autonomous traveling. Data relating to the environment (hereinafter referred to as "environment data"), detected by the situation recognition unit 2011, is transmitted to the autonomous driving control unit 2012.

An autonomous driving control unit 2012 uses the environment data generated by the situation recognition unit 2011 to control traveling of the host vehicle. For example, a travel track of the host vehicle is generated based on the environment data, and the acceleration or deceleration and the steering angle of the vehicle are determined such that the vehicle travels along the travel track. Information determined by the autonomous driving control unit 2012 is transmitted to the vehicle platform 100 (vehicle control ECU 101) via the vehicle control interface 300 described later. A well-known method can be adopted as a method for allowing the vehicle to autonomously travel.

In the present embodiment, the autonomous driving control unit 2012 generates the following data as the first control command and transmits it to the vehicle control interface 300: (1) data designating acceleration or deceleration, (2) data designating a steering angle, (3) data designating a shift range, (4) request for applying or releasing a parking brake, or (5) request for switching a power supply mode.

The data designating acceleration or deceleration is data designating an amount of change (positive or negative) in the vehicle speed per unit of time. The data designating a steering angle is data designating a turning angle of the steering wheel of the vehicle. The data represents typically a turning angle of a tire, but may represent another factor as long as it is related to steering of the vehicle. For example, the data may represent a steering wheel angle, a percentage of the maximum turning angle, or the like. Moreover, the planned track of the vehicle may be also used. The data designating a shift range is data designating a shift position (for example, Park, Drive, Reverse, and Neutral). The request for applying or releasing a parking brake is data indicating whether or not to operate the mechanical or electrical parking brake. The request for switching a power supply mode is data designating a plurality of power supply modes of the vehicle. The power supply modes include, for example, but are not limited to, "sleep (state where power supply of vehicle is cut off)", "standby (state where power is supplied from the auxiliary battery only)", "travel (power is supplied from the battery for traveling)". The first control command including these pieces of data is a general command that does not depend on a vehicle type or a manufacturer.

The sensor group 202 is a unit configured to detect the surroundings of the vehicle, and typically includes a monocular camera, a stereo camera, a radar, a LIDAR, a laser scanner, and the like. The sensor group 202 may include a device for acquiring a current location of the vehicle (such as a GPS module) in addition to those for detecting the surroundings of the vehicle. Information acquired by the sensors included in the sensor group 202 is transmitted to the autonomous driving ECU 201 (situation recognition unit 2011) as needed.

Next, the vehicle control interface 300 will be described. The control command handled by the vehicle control ECU 101 in the present embodiment is in a format specific to a vehicle and a manufacturer. On the other hand, the autonomous driving platform 200 is an apparatus developed by a third party and is expected to be installed in various vehicle types of various manufacturers. That is, it is expensive to connect both components to the same in-vehicle network. Therefore, in the present embodiment, the vehicle control interface 300 is used as a device that converts and relays data exchanged between the vehicle control ECU 101 and the autonomous driving ECU 201.

Figure 3:
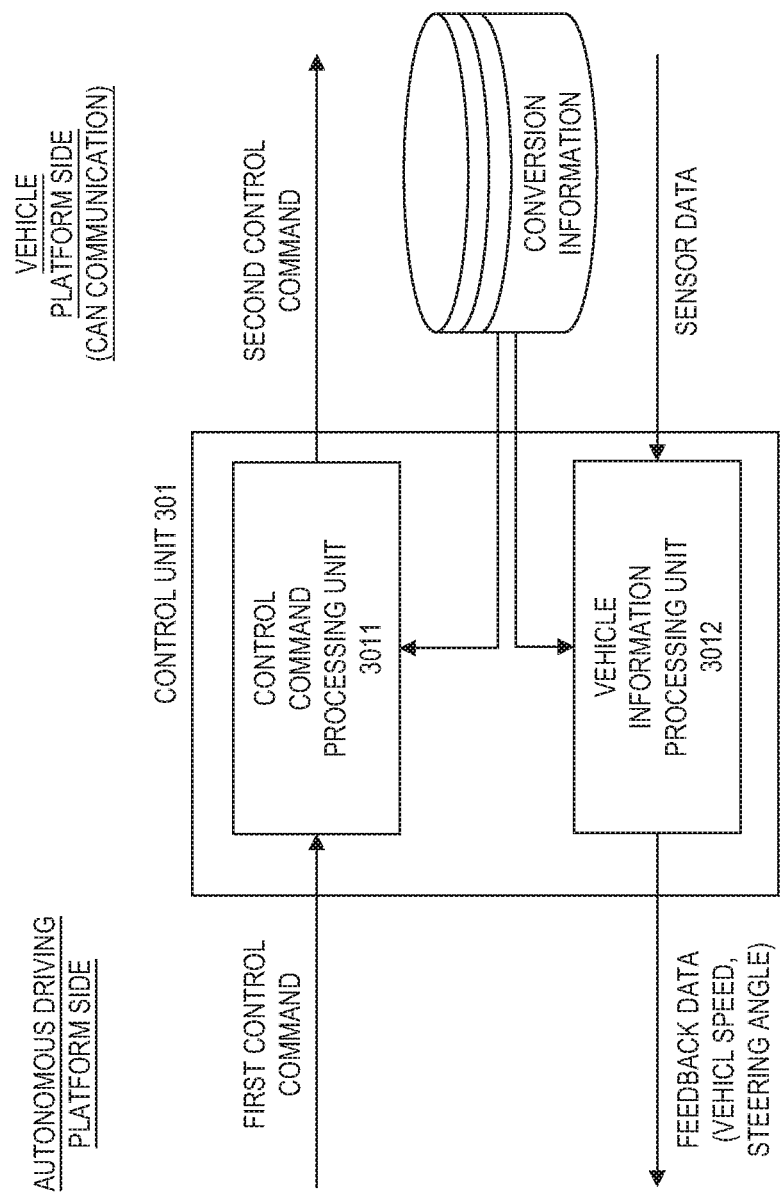
FIG. 3 is a diagram illustrating data input and output by a vehicle control interface.

A control unit 301 is a computer that converts the control command handled by the vehicle control ECU 101 into the control command handled by the autonomous driving ECU 201, and vice versa. The control unit 301 is configured by, for example, a CPU (central processing unit). As shown in FIG. 3, the control unit 301 includes two functional modules, a control command processing unit 3011 and a vehicle information processing unit 3012. Each functional module may be implemented by executing, by a CPU, a program stored in a storage unit 302 described later (neither shown).

The control command processing unit 3011 receives the first control command from the autonomous driving ECU 201, and converts the control command into data (second control command) that can be interpreted by the vehicle control ECU 101. For example, in a case in which the data designating acceleration or deceleration is included in the first control command, the designated acceleration or deceleration (for example, +3.0 km/h/s) is converted into the data indicating a degree of throttle opening, or into the data indicating a brake pressure. The second control command acquired by converting the control command is transmitted in a protocol or format specific to the vehicle platform 100. Furthermore, in a case in which the first control command includes the data designating a steering angle, the designated steering angle (for example, 10 degrees to the right) is converted into the data instructing a steering angle that can be interpreted by the vehicle control ECU 101. A conversion process is carried out using conversion information stored in the storage unit 302 described later. The processing will be described later.

The vehicle information processing unit 3012 receives information on a vehicle state from the vehicle control ECU 101 and converts the information into information that can be interpreted by the autonomous driving ECU 201 (information not specific to a vehicle type). In particular, the information transmitted in a protocol or format specific to the vehicle platform 100 is converted into information in a general format (hereinafter referred to as feedback data). Hereinafter, the information on a vehicle state is referred to as sensor data. The sensor data is based on information acquired by the steering angle sensor 111 and the vehicle speed sensor 112, for example, and is transmitted to the in-vehicle network by the vehicle control ECU 101. The sensor data is data in a format specific to the vehicle platform. The sensor data may be, for example, any data as long as feedback to the autonomous driving ECU 201 is possible, such as vehicle speed information, information on a turning angle of a tire, and information on a steering angle.

In the present embodiment, the vehicle information processing unit 3012 generates the following data as the feedback data and transmits it to the autonomous driving platform 200: (1) brake system state, (2) power train system state, and (3) direction control state. The brake system state is data relating to a vehicle brake system, and includes, for example, data relating to vehicle deceleration, wheel lock state and ABS operation state. The power train system state is data relating to a vehicle power train system, and includes, for example, data relating to vehicle speed, vehicle acceleration, wheel slip state and traction control state. The direction control state is data relating to a vehicle direction control system, and includes, for example, data relating to a turning angle of a tire, a steering angle, a traveling direction of the vehicle and lateral gravity applied to the vehicle. The feedback data including these pieces of data is general data that does not depend on a vehicle type or a manufacturer.

The storage unit 302 is a unit configured to store information, which is configured by a storage medium, such as a RAM, a magnetic disk and a flash memory. The storage unit 302 stores information for converting the first control command, generated by the autonomous driving ECU 201 (autonomous driving control unit 2012), into the second control command that can be interpreted by the vehicle control ECU 101 (hereinafter referred to as conversion information), and vice versa. The conversion information further includes information for converting sensor data specific to the vehicle into the feedback data.

The conversion information includes, for example, a configuration of data input or output to or from the vehicle control ECU 101, parameters thereof, and a table or a mathematical formulas for converting input values into parameters. Furthermore, the conversion information consists of the configuration of sensor data output from the vehicle control ECU 101, its parameters, tables for converting the parameters into physical values, mathematical formulas, and the like.

FIG. 4 is a diagram showing types of data converted by the conversion information. In the drawing, "Input" indicates that it is data from the autonomous driving ECU 201 to the vehicle control ECU 101, and "Output" indicates that it is data from the vehicle control ECU 101 to the autonomous driving ECU 201. In a case where data other than that shown in FIG. 4 is transmitted to the vehicle control interface 300, the data is discarded.

In the vehicle system according to the present embodiment, communication between the vehicle platform 100 and the autonomous driving platform 200 is carried out with a configuration stated above.

Figure 5:
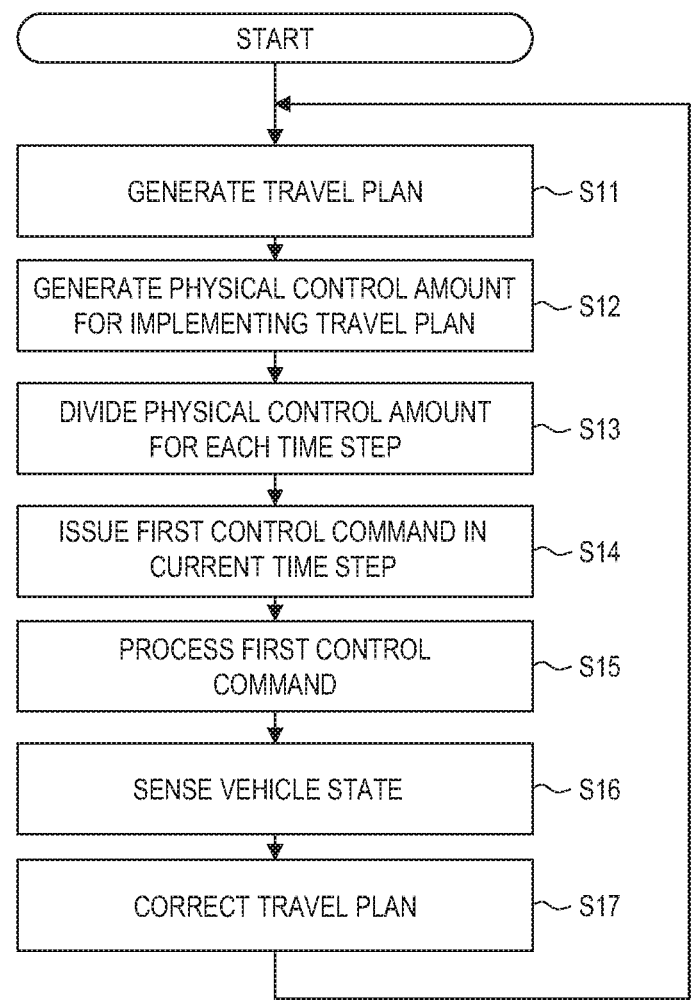
FIG. 5 is a flowchart illustrating processing executed in the first embodiment.
Figure 6:
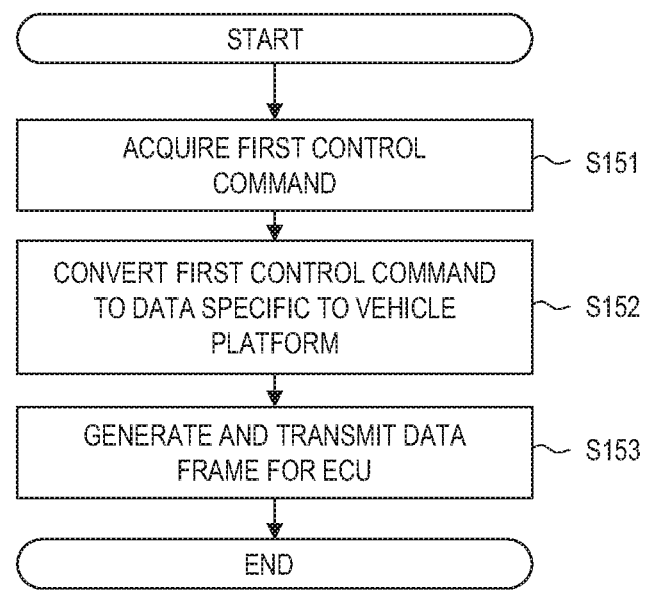
FIG. 6 is a flowchart illustrating processing executed in the first embodiment.

Next, a processing performed by the vehicle system according to the present embodiment will be described with reference to FIGS. 5 and 6, which are processing flowcharts. The processing shown in FIG. 5 is executed by the autonomous driving platform 200 at predetermined intervals.

Figure 7:
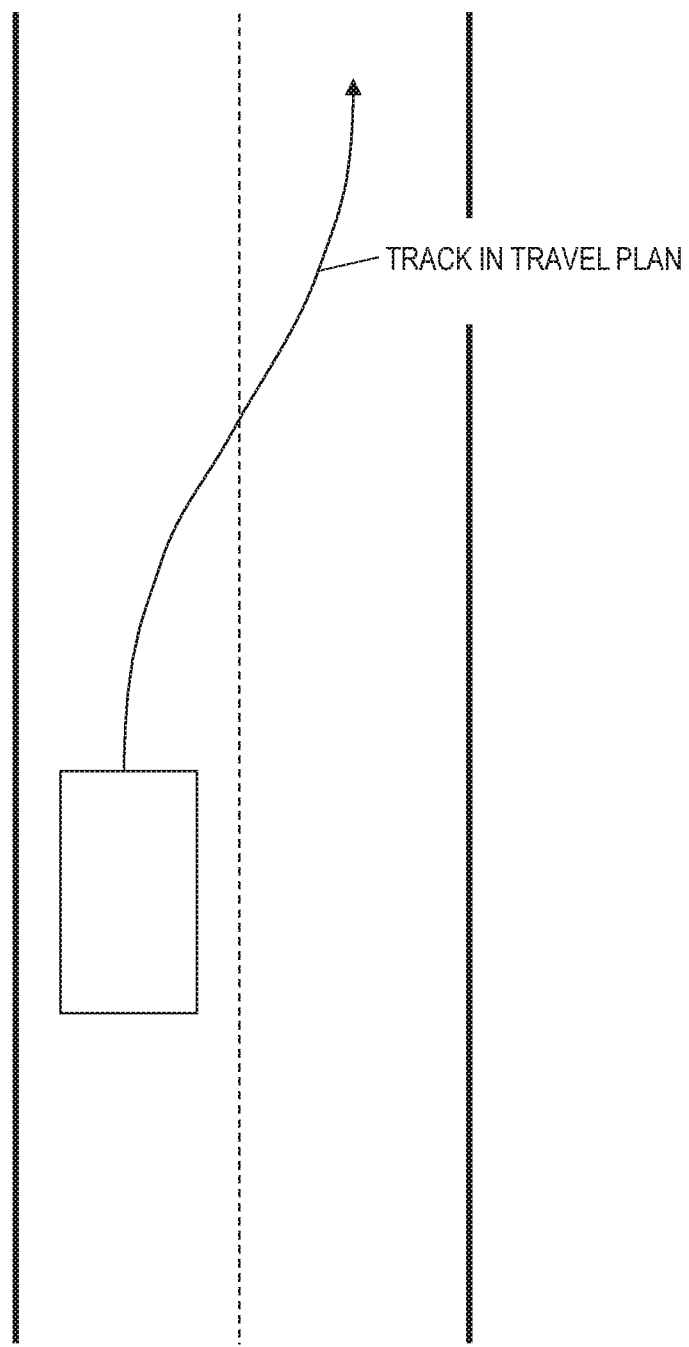
FIG. 7 is a diagram illustrating a vehicle travel plan.

In step S11, the autonomous driving ECU 201 generates a travel plan based on the information acquired from the sensor group 202. The travel plan is data indicating behavior of the vehicle in a predetermined interval. For example, as illustrated in FIG. 7, when the travel plan in which a vehicle traveling in a first lane moves to a second lane is generated, a travel track as illustrated is generated. The travel plan may include a travel track of the vehicle or may include information relating to acceleration or deceleration of the vehicle. The travel plan may also be generated based on information other than the exemplified information. For example, it may be generated based on a departure place, a transit point, a destination, map data, and the like.

Figure 8A:
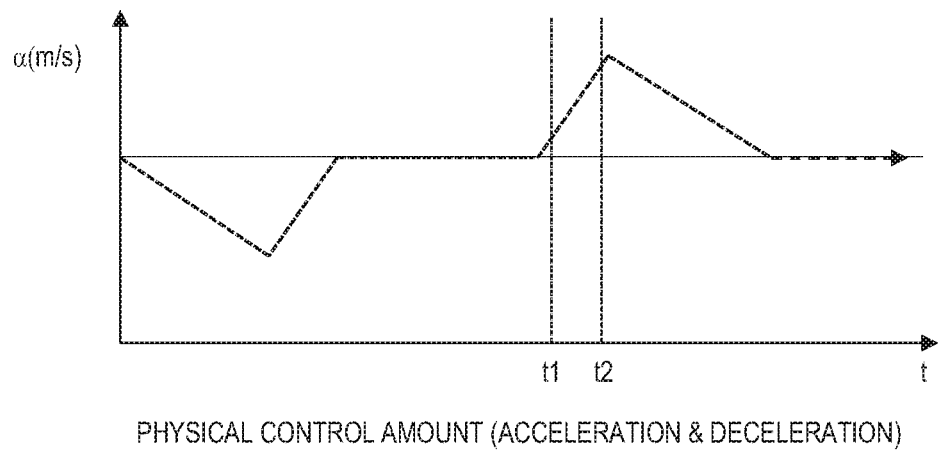
FIG. 8A is a diagram illustrating an amount of physical control (acceleration or deceleration) of a vehicle.
Figure 8B:
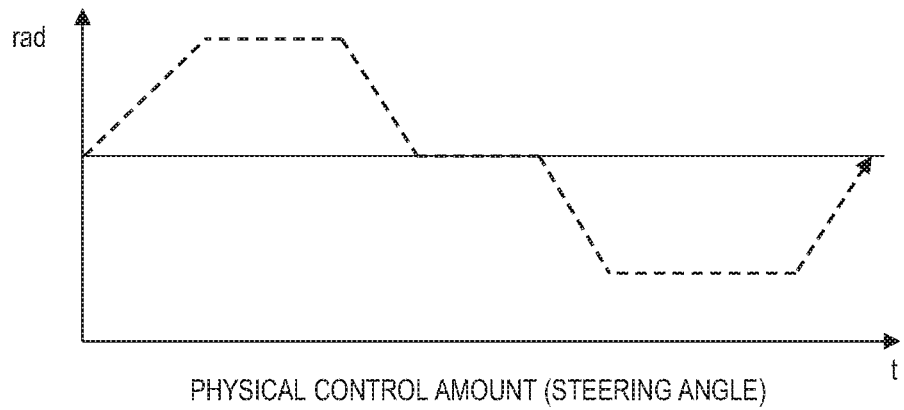
FIG. 8B is a diagram illustrating an amount of physical control (steering angle) of the vehicle.

In step S12, the autonomous driving ECU 201 generates an amount of physical control for implementing the travel plan. In the present embodiment, two types of an amount of physical control, i.e. an amount of physical control for acceleration or deceleration and an amount of physical control for a steering angle, are generated. FIG. 8A is a time chart showing an amount of control for acceleration or deceleration, and FIG. 8B is a time chart showing an amount of control for a steering angle. Each value may be generated based on a parameter set in advance, such as a relationship between the vehicle speed and the maximum steering angle, a relationship between the driving environment and the acceleration or deceleration (steering angle), or a period of time required to complete the operation (for example, lane change).

Figure 8C:
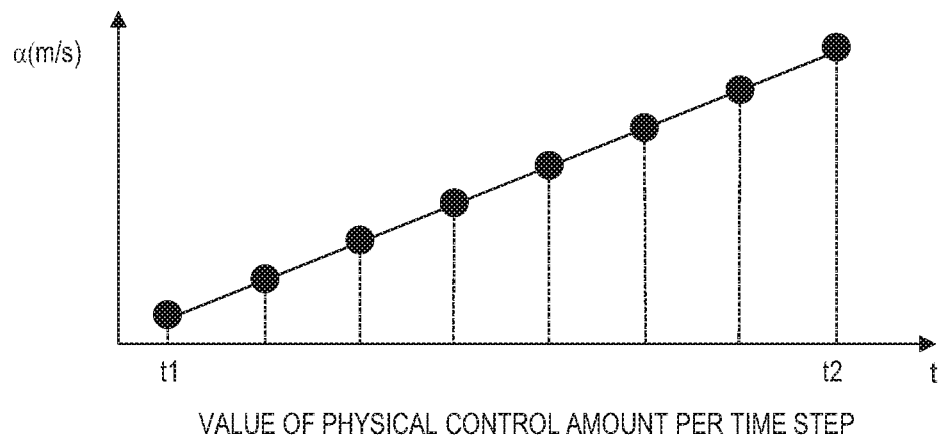
FIG. 8C is a diagram illustrating a value of the amount of physical control (acceleration or deceleration) of the vehicle for each time step.

In step S13, the autonomous driving ECU 201 divides each of the generated amounts of physical control into a plurality of time steps. The time step can be, for example, 100 milliseconds, but is not limited thereto. FIG. 8C shows an example in which the amount of physical control for the generated acceleration or deceleration is divided into seven steps during a period from time $t_1$ to time $t_2$.

In step S14, the autonomous driving ECU 201 issues the first control command based on the change in the amount of physical control from a current time step $t_n$ to a next time step $t_{n+1}$. For example, when one time step is 100 milliseconds and +2.0 km/h/s is designated as the acceleration or deceleration, a command for designating a speed change of 0.2 km/h per time step is generated. For example, when it is designated to change the steering angle by 20 degrees over 2 seconds, a command for designating a change in steering angle of 0.1 degree per time step is generated. The generated first control command is input to the control unit 301 of the vehicle control interface 300. The first control command may include other data depending on the travel plan. For example, the data designating a shift range and the data designating a parking brake state may be included.

In step S15, the vehicle control interface 300 (control unit 301) processes the acquired first control command. FIG. 6 is a diagram illustrating the processing in step S15 in detail. In step S151, the control command processing unit 3011 acquires the first control command transmitted from the autonomous driving ECU 201.

In step S152, the control unit 301 performs data conversion. In particular, the control command processing unit 3011 performs mutual conversion between the first control command and the second control command based on the conversion information stored in the storage unit 302.

In step S153, the generated second control command is transmitted to the vehicle control ECU 101. In this step, for example, the second control command generated in step S152 is encapsulated in a data frame transmitted or received by the in-vehicle network, and transmitted to the vehicle control ECU 101 as a destination. Furthermore, in step S15, in a case where the vehicle control interface 300 receives data other than that shown in FIG. 4, the data is discarded.

The description will be continued returning to FIG. 5. Step S16 is a step in which the autonomous driving ECU 201 detects a vehicle state after transmitting the second control command. In this step, the sensor data transmitted from the vehicle control ECU 101 is converted by the vehicle control interface 300, based on the conversion information, and then relayed to the autonomous driving ECU 201. The autonomous driving ECU 201, receiving such data, determines whether the vehicle is in a desired state or not.

Since the behaviors of the vehicle are influenced by current engine load, road conditions (for example, gradient), or the like, in the present embodiment, the autonomous driving ECU 201 receives feedback of the sensor data, and determines whether a desired amount of physical control is acquired or not. The sensor data is acquired by the vehicle information processing unit 3012, converted into the feedback data (data indicated as Output in FIG. 4), and then transmitted to the autonomous driving ECU 201. The feedback data may include data other than those exemplified, as long as it is defined in advance. For example, the feedback data may include data relating to factors that affect vehicle behaviors, such as tire turn angle, steering angle, angular velocity, engine load, road gradient (tilt), the number of occupants, loading capacity, road conditions, and traffic situation.

In step S17, the autonomous driving ECU 201 corrects the travel plan based on the received feedback data. For example, if the feedback data indicates that the engine load is high and the requested acceleration cannot be acquired, the travel plan is corrected so that higher acceleration can be acquired. In addition, although the case in which the travel plan is corrected is given in this example, there may also be a case in which the travel control may not be changed, but the physical control amount for implementing the travel plan may be corrected.

In the vehicle system according to the first embodiment, by performing the processing stated above, it is possible to perform appropriate vehicle travel control in accordance with the vehicle state. In particular, by defining data to be relayed by the vehicle control interface 300 in advance and filtering other data, it is possible to prevent access to unnecessary vehicle functions and to ensure safety and security. Furthermore, by using the conversion information, the autonomous driving platform 200 can be applied to various vehicle types without changes.

In the description of the present embodiment, the autonomous driving ECU 201 corrects the actual state of the vehicle so that it reflects the ideal state of the vehicle based on the feedback data. However, the vehicle control interface 300 may also execute the correction. For example, the feedback data generated by the vehicle information processing unit 3012 may be input to the control command processing unit 3011 so that the control command processing unit 3011 automatically executes the correction. In addition, the autonomous driving ECU 201 may generate data designating an amount to be corrected independently from the acceleration or deceleration command and the steering command and may transmit such data to the vehicle control interface 300.

Modified Examples

The embodiments stated above are mere examples, and the present disclosure can be implemented with appropriate modifications within a scope not departing from the gist thereof. For example, the processing and units described in the present disclosure can be freely combined and implemented unless technical contradiction occurs.

Furthermore, the processing described as being performed by a single device may be executed in a shared manner by a plurality of devices. Alternatively, the processing described as being performed by different devices may be executed by a single device. In the computer system, the hardware configuration (server configuration) for implementing each function can be flexibly changed.

The present disclosure can also be implemented by supplying a computer program for executing the functions described in the embodiments in a computer, and reading and executing the program by one or more processors included in the computer. Such a computer program may be provided to the computer by a non-transitory computer-readable storage medium connectable to a computer system bus, or may be provided to the computer via the network. Examples of the non-transitory computer-readable storage media include random disk (such as a magnetic disk (floppy (registered trademark) disk, hard disk drive (HDD), and the like) and optical disc (CD-ROM, DVD disk, Blu-ray disc, and the like)), read-only memory (ROM), random access memory (RAM), EPROM, EEPROM, magnetic card, flash memory, optical card, and random type of medium suitable for storing electronic instructions.

What is claimed is:

1. A vehicle control interface that connects a vehicle platform including a first computer that performs travel control of a vehicle and an autonomous driving platform including a second computer that performs autonomous driving control of the vehicle, the vehicle control interface comprising:
   a control unit comprising a processor and configured to execute:
      acquiring, from the second computer, a first control command including a plurality of commands for the vehicle platform;
      removing, from the first control command, a command that does not correspond to a predetermined kind of command by filtering the plurality of commands included in the first control command;
      converting the first control command, after filtering the plurality of commands, into a second control command for the first computer; and
      transmitting the second control command to the first computer.

2. The vehicle control interface according to claim 1, wherein the first control command is data that is not specific to the first computer provided in the vehicle, and the second control command is data that is specific to the first computer.

3. The vehicle control interface according to claim 1, further comprising:

a storage unit comprising a memory and configured to store conversion information that is a rule for converting the first control command and the second control command, wherein the control unit is configured to convert the first control command into the second control command based on the conversion information.

4. The vehicle control interface according to claim 1, wherein the predetermined kind of command includes at least a command for accelerating or decelerating the vehicle and a command for steering the vehicle.

5. The vehicle control interface according to claim 1, wherein the control unit is configured to:
  acquire, from the first computer, first vehicle information including pieces of sensor data sensed in the vehicle platform,
  remove, from the first vehicle information, sensor data that does not correspond to a predetermined kind of sensor data by filtering the pieces of sensor data included in the first vehicle information,
  convert the first vehicle information, after filtering the pieces of sensor data, into second vehicle information for the second computer, and
  transmit the second vehicle information to the second computer.

6. The vehicle control interface according to claim 5, wherein the first vehicle information is data that is specific to the first computer provided in the vehicle, and the second vehicle information is data that is not specific to the first computer.

7. A vehicle system comprising:
  a vehicle platform including a first computer that performs travel control of a vehicle; and
  a vehicle control interface configured to connect the vehicle platform and an autonomous driving platform including a second computer that performs autonomous driving control of the vehicle,
  wherein the vehicle control interface includes a control unit comprising a processor, the control unit configured to execute:
  acquiring, from the second computer, a first control command including a plurality of commands for the vehicle platform;
  removing, from the first control command, a command that does not correspond to a predetermined kind of command by filtering the plurality of commands included in the first control command;
  converting the first control command, after filtering the plurality of commands, into a second control command for the first computer; and
  transmitting the second control command to the first computer.

8. A vehicle control interface that connects a vehicle platform including a first computer that performs travel control of a vehicle and an autonomous driving platform including a second computer that performs autonomous driving control of the vehicle, the vehicle control interface comprising:
  a control unit comprising a processor and configured to execute:
    acquiring, from the first computer, first vehicle information including pieces of sensor data sensed in the vehicle platform;
    removing, from the first vehicle information, sensor data that does not correspond to a predetermined kind of sensor data by filtering the pieces of sensor data included in the first vehicle information;
    converting the first vehicle information, after filtering the pieces of sensor data, into second vehicle information for the second computer, the second vehicle information not depending on a vehicle type or manufacturer; and
    transmitting the second vehicle information to the second computer.

9. The vehicle control interface according to claim 8, wherein the second vehicle information is general data which does not depend on the vehicle type or manufacturer.

10. The vehicle control interface according to claim 8, wherein the first vehicle information is data that is specific to the first computer provided in the vehicle, and the second vehicle information is data that is not specific to the first computer.

11. A vehicle control interface that connects a vehicle platform including a first computer that performs travel control of a vehicle and an automatic driving platform including a second computer that performs automatic driving control of the vehicle, the vehicle control interface comprising:
  a control unit comprising a processor and configured to execute:
    acquiring, from the second computer, a first control command including a plurality of commands for the vehicle platform;
    removing, from the first control command, a command that does not correspond to a predetermined kind of command by filtering the plurality of commands included in the first control command;
    converting the first control command, after filtering the plurality of commands, into a second control command for the first computer;
    transmitting the second control command to the first computer;
    acquiring, from the first computer, first vehicle information including pieces of sensor data sensed in the vehicle platform;
    removing, from the first vehicle information, sensor data that does not correspond to a predetermined kind of sensor data by filtering the pieces of sensor data included in the first vehicle information;
    converting the first vehicle information, after filtering the pieces of sensor data, into second vehicle information for the second computer; and
    transmitting the second vehicle information to the second computer.

* * * * *